Patented June 30, 1925.

1,544,013

UNITED STATES PATENT OFFICE.

JOHN W. KITCHIN, OF HORLEY, AND VICTOR LEFEBURE, OF LONDON, ENGLAND.

TREATMENT OF TIMBER.

No Drawing.   Application filed January 15, 1923.   Serial No. 612,803.

*To all whom it may concern:*

Be it known that we, JOHN WILLIAM KITCHIN and VICTOR LEFEBURE, both subjects of the King of England, and residents, respectively, of Horley, Surrey, England, and London, England, have invented certain new and useful Improvements in the Treatment of Timber, of which the following is a specification.

This invention relates to the treatment of timber and has particular reference to processes in which the timber is seasoned by impregnating the fibres with a solution of sugar with or without one or more additional carbohydrates such as starch, dextrine or the like.

It has been proposed to use in conjunction with such carbohydrate solutions various substances such for example as certain metallic salts which act to prevent fungoid growths and to render the timber capable of resisting the attacks of insects.

The present invention is primarily concerned with a process generally similar to those referred to above but possessing further advantages in that it is more economical and less complicated in practice.

Certain of the substances which have been used, whilst effective for the purpose for which they are intended have entailed loss at certain stages of the treatment—as for instance when solutions are cooled down during or between operations—due to the deposit of a fraction of one or other of the active agents in the form of sludge which has to be replaced by fresh material or else recovered by an independent operation.

This in practice necessitated the use of a larger amount of the active agent than was actually needed for the quantity of timber being treated.

According to this invention this loss is avoided and the process is simplified by the employment of a single or mixed carbohydrate solution containing sugar and a fluoride, dinitrophenolate or dinitrocresolate of sodium, potassium or other metal or a mixture of two or more of these substances which are effective for fungicidal and insecticidal purposes in readily absorbable concentrations.

It is naturally of advantage to prevent almost or entirely the deposit or precipitation of fungicidal substance employed and to secure this end a further improvement according to this invention—which need not always be employed—consists in maintaining the solution at all stages of the impregnating process and whilst it is being stored at a temperature not less than about 110° F.

The amount of fungicidal substance contained in the single or mixed carbohydrate solution will naturally vary with the nature and size of the pieces of timber being treated and the purpose for which it is to be used but the following may be given as a specific example as to the proportions of the ingredients suitable for treating oak of average dimensions.

An aqueous carbohydrate solution or liquor is prepared of which besides water the principal ingredient is some form of sugar generally molasses or syrup. This should be made up with or without the addition of one or more carbohydrates such as 3% of dextrine so that the density of the solution is about 1.080. To this carbohydrate solution is added 1% of sodium fluoride and ¼% of dinitrophenolate. The combined solution in the treatment tank with the wood immersed in it is raised in temperature up to between 212° and 215° F., in this particular case the temperature may be raised as rapidly as the means available permit up to 140° F., and the solution is then kept at this constant temperature for one hour after which the temperature is raised at the rate of 24° F., per hour up to boiling point. The temperature is kept at boiling point for three and a half hours and then gradually lowered, either naturally or artificially, to 135° F., when the solution is withdrawn and the wood removed from the tank to be either naturally air dried or artificially kiln dried as required. The proportions of the component parts of the solution are maintained throughout the above mentioned operations by the addition of so much of water and of the other ingredients as are needed, and with such a combined solution precipitation is almost or entirely prevented.

The rates of raising and lowering the temperature of the solution, and the length of time it is retained at boiling point vary with the particular wood being treated, and the point at which the solution is withdrawn on being cooled down to between 180° and 110° F. also depends upon the wood and the purpose for which it is subsequently to be used.

The substances used according to the present invention have the further advantage that double compounds are formed with the solution of sugar whether this sugary solution contains an additional carbohydrate or not and these substances are held and retained in the wood together with the carbohydrate in the form of a double compound.

It will be appreciated that the time required for the various stages of the process, the temperature employed and the strength of the solution used will depend upon the nature and condition of the timber to be treated, upon the use to which such timber is subsequently to be put, and upon the general construction and arrangement of the tanks or apparatus in which the process is carried out.

What we claim as our invention and desire to secure by Letters Patent is:—

1. A process for treating timber which consists in impregnating it with a carbohydrate solution containing sugar, sodium fluoride and sodium dinitrophenolate.

2. A process for treating timber which consists in impregnating it with a solution containing a plurality of carbohydrates, one of which is sugar and sodium fluoride and sodium dinitrophenolate.

3. A process for treating timber which consists in impregnating it with a carbohydrate solution containing sugar and sodium fluoride and sodium dinitrophenolate and in maintaining the solution at all stages of the impregnating process and during storage at a temperature of not less than 110° F.

4. A solution for the treatment of timber consisting of a solution containing a plurality of carbohydrates, one of which is sugar and sodium fluoride and sodium dinitrophenolate.

5. A process for the treatment of timber which consists in impregnating it in a solution containing some form of sugar, 1% of sodium fluoride and ¼% of dinitrophenolate, the temperature of the solution together with the timber immersed therein being raised to approximately 212° F. maintained at that temperature for not less than three hours and gradually lowered to 135° F. whereupon the solution is withdrawn and the wood removed and dried.

6. An aqueous carbohydrate solution for the treatment of timber consisting of water and sugar in the form of syrup with the addition of 1% of sodium fluoride and a ¼% of dinitrophenolate and having a density of approximately 1.080.

7. An aqueous carbohydrate solution for the treatment of timber consisting of water and sugar in the form of syrup with the addition of 1% of sodium fluoride and a ¼% of dinitrophenolate and an additional carbohydrate such as dextrine so as to give a density to the solution of about 1.080.

In testimony whereof we have signed our names to this specification.

JOHN W. KITCHIN.
VICTOR LEFEBURE.